US012600150B2

(12) United States Patent
Sunaga

(10) Patent No.: US 12,600,150 B2
(45) Date of Patent: Apr. 14, 2026

(54) RECORDING DEVICE, SERVICE LIFE ESTIMATION METHOD

(71) Applicant: SEIKO EPSON CORPORATION, Tokyo (JP)

(72) Inventor: Yasuo Sunaga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 18/485,660

(22) Filed: Oct. 12, 2023

(65) Prior Publication Data

US 2024/0123742 A1 Apr. 18, 2024

(51) Int. Cl.
*B41J 11/42* (2006.01)
*B41J 29/38* (2006.01)

(52) U.S. Cl.
CPC ............... *B41J 11/42* (2013.01); *B41J 29/38* (2013.01)

(58) Field of Classification Search
CPC . B41J 11/42; B41J 13/103; B41J 13/10; B41J 29/38; G03G 15/6508; G03G 15/6502; G03G 15/6511
See application file for complete search history.

(56) References Cited

U.S. PATENT DOCUMENTS

2014/0241738 A1* 8/2014 Matsuda ............ G03G 21/1661 399/23
2016/0279979 A1* 9/2016 Kohama .............. B41J 11/0075

FOREIGN PATENT DOCUMENTS

JP 2015-175920 A 10/2015
JP 2016-188137 A 11/2016

* cited by examiner

*Primary Examiner* — Jason S Uhlenhake
(74) *Attorney, Agent, or Firm* — WORKMAN NYDEGGER

(57) ABSTRACT

A recording device includes a recording unit that performs recording on a medium, a paper feeding cassette that accommodates the medium and is configured to be opened/closed, a transport unit that transports the medium accommodated in the paper feeding cassette along a transport path, a transport detection unit that detects the medium at a detection position provided at the transport path, a calculation unit that calculates a transport time required for the medium supplied from the paper feeding cassette to reach the detection position based on a result of detection by the transport detection unit, a determination unit that determines presence or absence of whether the paper feeding cassette is opened/closed, and an estimation unit that estimates a service life of the transport detection unit or the transport unit based on time information about the transport time and opening/closing information about determination of whether the paper feeding cassette is opened/closed.

8 Claims, 3 Drawing Sheets

RECORDING DEVICE, SERVICE LIFE ESTIMATION METHOD

The present application is based on, and claims priority from JP Application Serial Number 2022-164538, filed Oct. 13, 2022, the disclosure of which is hereby incorporated by reference herein in its entirety.

BACKGROUND

1. Technical Field

The present disclosure relates to a recording device such as a printer and a service life estimation method.

2. Related Art

For example, JP-A-2015-175920 discloses an image forming apparatus that is an example of a recording device that forms an image on a recording material that is an example of a medium. The image forming apparatus includes a paper feeding cassette, a transport roller that is an example of a transport unit, and a sensor that is an example of a transport detection unit.

The paper feeding cassette accommodates a recording material. The transport roller transports a medium supplied from the paper feeding cassette along a transport passage that is an example of a transport path. The sensor detects the recording material transported along the transport passage. The image forming apparatus determines the degree of deterioration of the transport roller according to an arrival time that is an example of a transport time required for the recording material to reach the sensor.

The transport time varies depending on the deterioration of the transport unit, the deterioration of the transport detection unit, the state of the medium in the paper feeding cassette, and the like. Therefore, it is difficult to estimate the degree of deterioration of the transport detection unit and the degree of deterioration of the transport unit with high accuracy.

SUMMARY

According to an aspect of the present disclosure, a recording device includes a recording unit that performs recording on a medium, a paper feeding cassette that accommodates the medium and is configured to be opened/closed, a transport unit that transports the medium accommodated in the paper feeding cassette along a transport path, a transport detection unit that detects the medium at a detection position provided at the transport path, a calculation unit that calculates a transport time required for the medium supplied from the paper feeding cassette to reach the detection position based on a result of detection by the transport detection unit, a determination unit that determines presence or absence of whether the paper feeding cassette is opened/closed, and an estimation unit that estimates a service life of the transport detection unit or the transport unit based on time information about the transport time and opening/closing information about determination of whether the paper feeding cassette is opened/closed.

According to another aspect of the present disclosure, a recording device includes a recording unit that performs recording on a medium, a paper feeding cassette that accommodates the medium and is configured to be opened/closed, a transport unit that transports the medium accommodated in the paper feeding cassette along a transport path, a transport detection unit that detects the medium at a detection position provided at the transport path, a calculation unit that calculates a transport time required for the medium supplied from the paper feeding cassette to reach the detection position based on a result of detection by the transport detection unit, a determination unit that determines presence or absence of opening/closing of the paper feeding cassette, a storage unit that stores time information about the transport time and opening/closing information about determination of whether the paper feeding cassette is opened/closed in association with each other, and an output unit that outputs the time information and the opening/closing information stored in the storage unit to an external device including an estimation unit configured to estimate a service life of the transport detection unit or the transport unit.

According to still another aspect of the present disclosure, a service life estimation method performed by a recording device including a recording unit that performs recording on a medium, a paper feeding cassette that accommodates the medium and is configured to be opened/closed, a transport unit that transports the medium accommodated in the paper feeding cassette along a transport path, and a transport detection unit that detects the medium at a detection position provided at the transport path, the method includes calculating a transport time required for the medium supplied from the paper feeding cassette to reach the detection position, determining presence or absence of whether the paper feeding cassette is opened/closed, and estimating a service life of the transport detection unit or the transport unit based on time information about the transport time and opening/closing information about determination of whether the paper feeding cassette is opened/closed.

DESCRIPTION OF EMBODIMENTS

Embodiment

Figure 1:
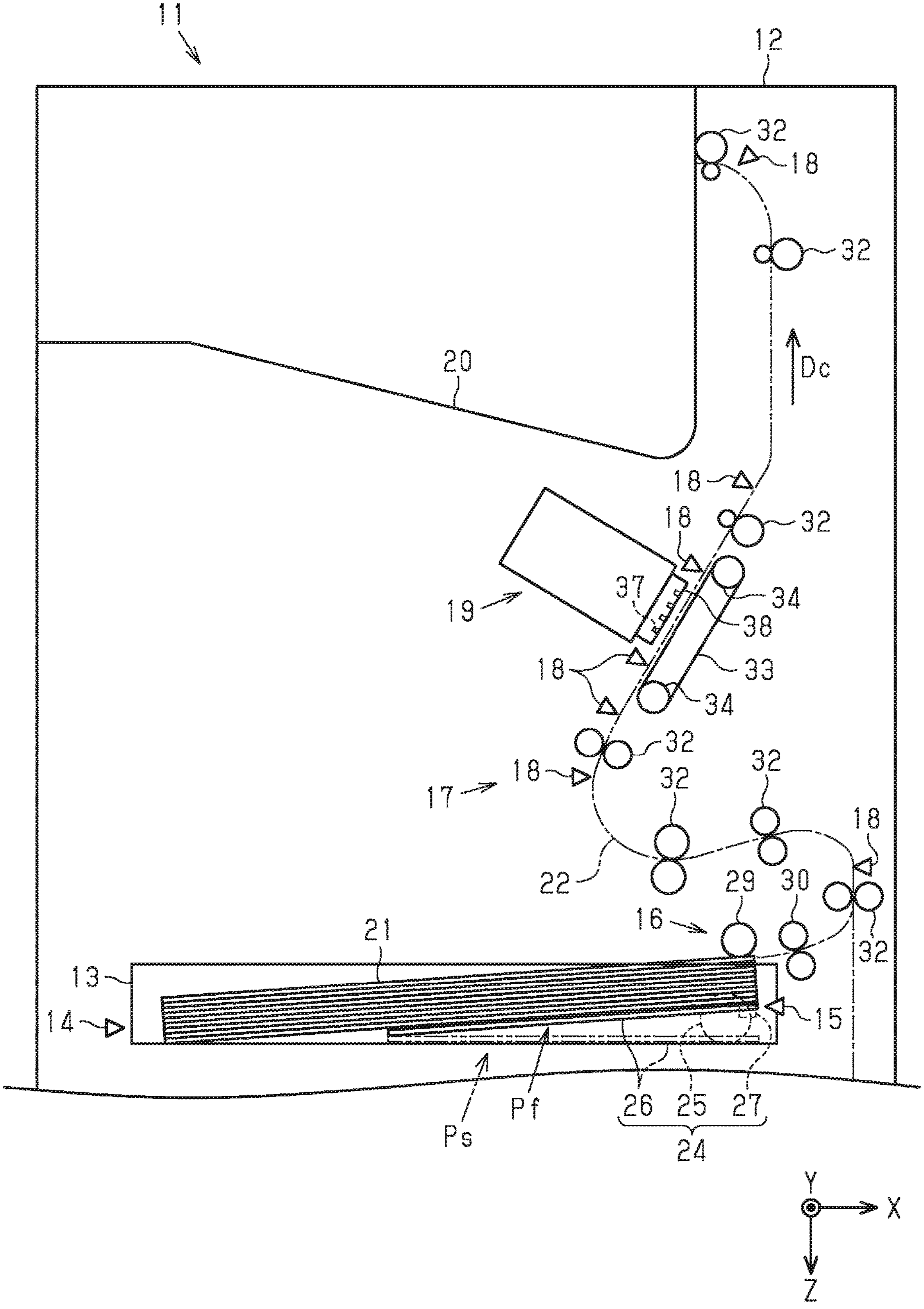
FIG. 1 is a schematic diagram of an embodiment of a recording device.

An embodiment of a recording device and a service life estimation method will be described below with reference to the drawings. The recording device of the present embodiment is an ink jet printer that performs printing by ejecting ink that is an example of a liquid onto a medium such as a paper sheet, a fabric cloth, vinyl, a plastic part, or a metal part. In the drawing, assuming that a recording device 11 is placed on a horizontal plane, the direction of gravity is indicated by the Z axis and the directions along the horizontal plane are indicated by the X axis and the Y axis. The X axis, the Y axis, and the Z axis are orthogonal to each other.

Recording Device

As shown in FIG. 1, the recording device 11 may include a main body 12, a paper feeding cassette 13, a cassette detection unit 14, a lift detection unit 15, a feeding unit 16, a transport unit 17, and one or more transport detection units 18, a recording unit 19, and a stacker 20. The recording device 11 may include a plurality of paper feeding cassettes 13, a plurality of cassette detection units 14, and a plurality of feeding units 16. In FIG. 1, a transport path 22 along which a medium 21 is transported is indicated by a dash-dot line. The transport path 22 is a path that links the paper feeding cassette 13 with the stacker 20.

Paper Feeding Cassette

The paper feeding cassette 13 can accommodate the medium 21. The paper feeding cassette 13 can be inserted into and pulled out of the main body 12. Inserting the paper feeding cassette 13 into the main body 12 is also referred to as closing the paper feeding cassette 13. Pulling out the paper feeding cassette 13 from the main body 12 is also referred to as opening the paper feeding cassette 13. The paper feeding cassette 13 is configured to be opened/closed.

The paper feeding cassette 13 may accommodate a plurality of media 21 in a stacked state. The medium 21 can be set by opening the paper feeding cassette 13. The medium 21 can be fed by closing the paper feeding cassette 13.

The cassette detection unit 14 may detect the paper feeding cassette 13 in a closed state. It is possible to detect opening/closing of the paper feeding cassette 13 in a state where the recording device 11 is turned on.

The paper feeding cassette 13 may have a lift mechanism 24. The lift mechanism 24 can move the medium 21 up and down. The lift mechanism 24 is configured to perform a lift-up operation for lifting the medium 21. The lift mechanism 24 may include a lift motor 25, a hopper 26 and a retainer 27.

The hopper 26 is lifted by driving the lift motor 25. The hopper 26 is movable between a set position Ps indicated by a two-dot chain line in FIG. 1 and a supply position Pf indicated by a solid line in FIG. 1. The supply position Pf is a position above the set position Ps. The hopper 26 pushes up at least a portion of the medium 21 by moving from the set position Ps to the supply position Pf. The hopper 26 brings the medium 21 closer to the feeding unit 16 by rising.

The retainer 27 retains the hopper 26 at the supply position Pf. The retainer 27 releases retention of the hopper 26 as the paper feeding cassette 13 is opened. That is, when the paper feeding cassette 13 is opened, the hopper 26 moves to the set position Ps by its own weight. Therefore, the user can place the medium 21 on the hopper 26 positioned at the set position Ps by opening the paper feeding cassette 13. When the paper feeding cassette 13 is closed, the lift motor 25 lifts the hopper 26 positioned at the set position Ps, and the retainer 27 retains the hopper 26 at the supply position Pf.

The lift detection unit 15 may detect the lift mechanism 24 at the supply position Pf. Specifically, the lift detection unit 15 can detect the hopper 26 at the supply position Pf. The lift detection unit 15 may detect that the retainer 27 retains the hopper 26 at the supply position Pf. The lift detection unit 15 may be, for example, an optical sensor or a contact sensor. The lift detection unit 15 may detect that the hopper 26 has moved from the set position Ps to the supply position Pf by detecting the number of rotations of the lift motor 25 using, for example, a rotary encoder.

Feeding Unit

The feeding unit 16 feeds the media 21 accommodated in the paper feeding cassette 13 one by one to the transport path 22 from the paper feeding cassette 13. The feeding unit 16 may include a feed roller 29 and a separation unit 30.

The feed roller 29 feeds the medium 21 to the transport path 22 by rotating in a state of pinching the medium 21 between the feed roller 29 and the hopper 26. The feed roller 29 feeds the uppermost medium 21 among the media 21 accommodated in the paper feeding cassette 13. The separation unit 30 separates the media 21 fed in a stacked state one by one. The separation unit 30 holds back the second and subsequent media 21 from the top in the paper feeding cassette 13.

Transport Unit

The transport unit 17 transports the medium 21 accommodated in the paper feeding cassette 13 along the transport path 22. The transport unit 17 transports the medium 21 in a transport direction Dc. The transport direction Dc is a direction along the transport path 22. The transport direction Dc is a direction from the paper feeding cassette 13 toward the stacker 20. The transport unit 17 may include one or more transport rollers 32, an endless transport belt 33, and a pair of pulleys 34.

The transport rollers 32 transport the medium 21 along the transport path 22 by rotating in a state of pinching the medium 21. The transport roller 32 discharges the printed medium 21 to the stacker 20. The stacker 20 receives the transported medium 21.

The transport belt 33 is stretched over the pair of pulleys 34. The transport belt 33 faces the recording unit 19 with the transport path 22 interposed therebetween. The transport belt 33 supports a portion of the medium 21 in a flat state. The transport belt 33 transports the medium 21 by rotating in a state where the medium 21 is attracted.

Recording Unit

The recording unit 19 may have a plurality of nozzles 37 for ejecting a liquid. The recording unit 19 may have a nozzle face 38 in which the plurality of nozzles 37 is opened. The recording unit 19 may have the nozzle face 38 inclined with respect to the horizontal plane. The recording unit 19 performs printing on the medium 21 by ejecting a liquid onto the medium 21 supported by the transport belt 33. Printing is one means of recording information. The recording unit 19 of the present embodiment records on the medium 21 by printing. The recording unit 19 may be of a line type that performs printing by ejecting a liquid onto the medium 21 transported in a state where the medium 21 is stationary. The recording unit 19 may be of a serial type that performs printing by ejecting a liquid while moving.

Transport Detection Unit

The transport detection unit 18 detects the medium 21 at detection positions provided at the transport path 22. The recording device 11 may include a plurality of transport detection units 18. The plurality of transport detection units 18 detects the medium 21 at different detection positions.

The transport detection unit 18 may be a reflective optical sensor that includes, for example, a light projecting unit (not shown) and a light receiving unit (not shown) and detects light reflected by the medium 21. The light projecting unit and the light receiving unit may be provided with the transport path 22 interposed therebetween. The transport detection unit 18 may be a transmissive optical sensor that detects the medium 21 when light is blocked. The transport detection unit 18 may be a contact sensor that detects the medium 21 by contacting the transported medium 21.

Recording System

Figure 2:
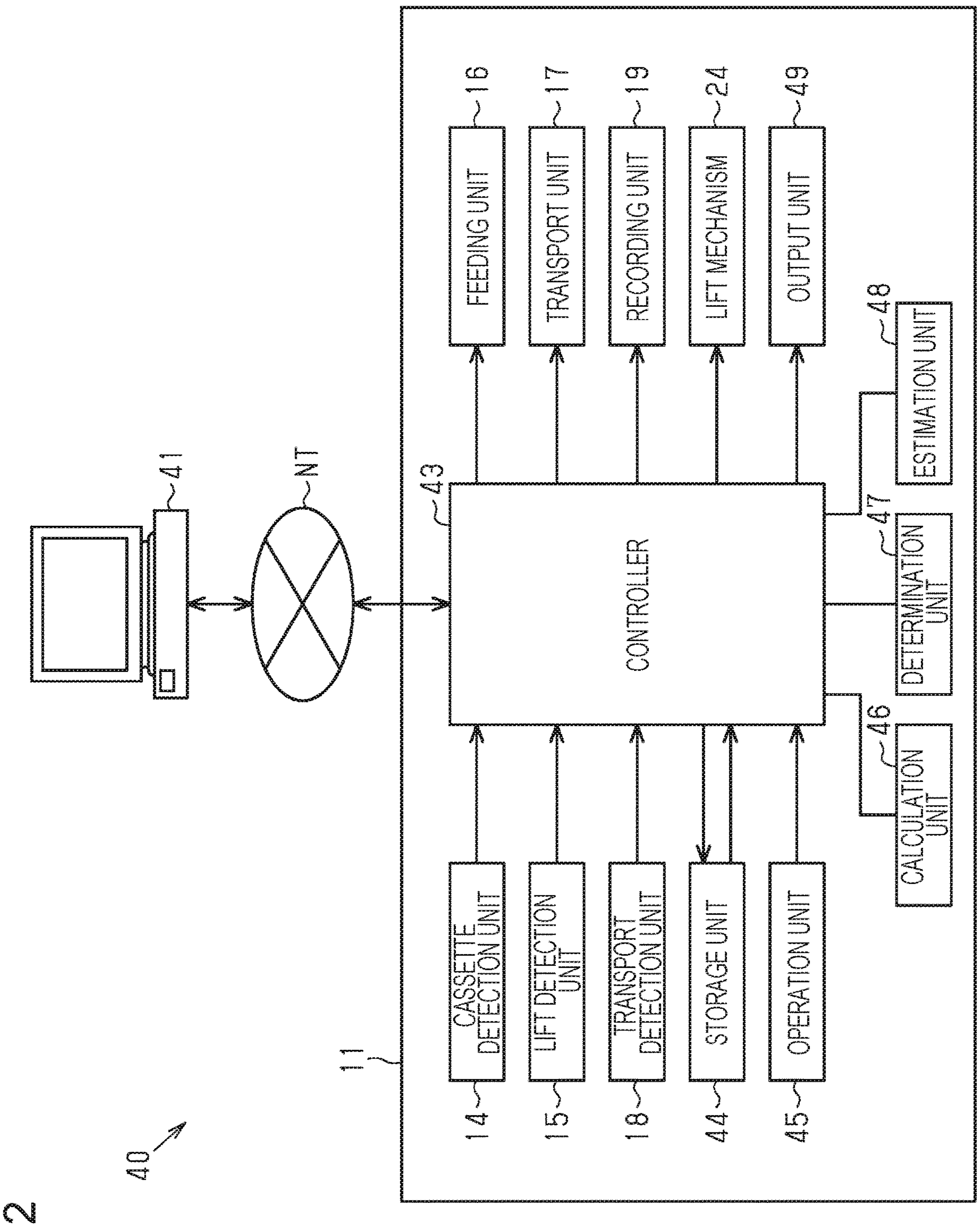
FIG. 2 is a schematic diagram of a recording system including the recording device.

As shown in FIG. 2, the recording device 11 may be included in a recording system 40. The recording system 40 may include a computer 41 and the recording device 11. The computer 41 and the recording device 11 may be able to communicate with each other via a network NT such as the Internet.

The recording device 11 may include a controller 43, a storage unit 44, an operation unit 45, a calculation unit 46, a determination unit 47, an estimation unit 48 and an output unit 49. The controller 43 comprehensively controls driving of respective mechanisms in the recording device 11 and controls various operations performed in the recording device 11. The controller 43 may control the lift mechanism 24 based on the result of detection by the lift detection unit 15. The controller 43 can be configured as a circuit including a: one or a plurality of processors that performs various processes according to computer programs, one or a plurality of dedicated hardware circuits that performs at least part of the various processes, or y: a combination thereof. The hardware circuit is, for example, an application specific integrated circuit. The processor includes a CPU and a memory such as a RAM and a ROM, and the memory stores a program code or an instruction configured to cause the CPU to execute a process. The memory, that is, a computer-readable medium, includes any readable medium that can be accessed by a general-purpose or dedicated computer.

The storage unit 44 is, for example, a memory such as the RAM and the ROM described above. The storage unit 44 may be provided separately from the controller 43 or may be included in the controller 43. The storage unit 44 stores various programs and various parameters. The controller 43 may function as the calculation unit 46, the determination unit 47 and the estimation unit 48 by executing programs stored in the storage unit 44. The function of at least one of the calculation unit 46, the determination unit 47, and the estimation unit 48 may be implemented by the computer 41 executing a program.

The operation unit 45 may have a button, a panel, a switch, and the like for performing various operations of the recording device 11. The output unit 49 may be capable of outputting information about the recording device 11. The output unit 49 may be a display capable of outputting information in the form of an image, a video, a character, or the like. The output unit 49 and the operation unit 45 may be configured integrally like a touch panel, for example. The output unit 49 may be a speaker capable of outputting information by voice, sound, or the like. The output unit 49 may be a light equipment capable of outputting information with light. The light equipment may output information, for example, by illuminating a corresponding label. The output unit 49 may be a communication device that outputs information to a device other than the recording device 11, or a coupling terminal that couples a communication cable for communication. For example, the output unit 49 may transmit information to the computer 41. The recording unit 19 may output information by perform printing on the medium 21 or the like. In this case, the recording unit 19 functions as the output unit 49.

Estimation Routine

Figure 3:
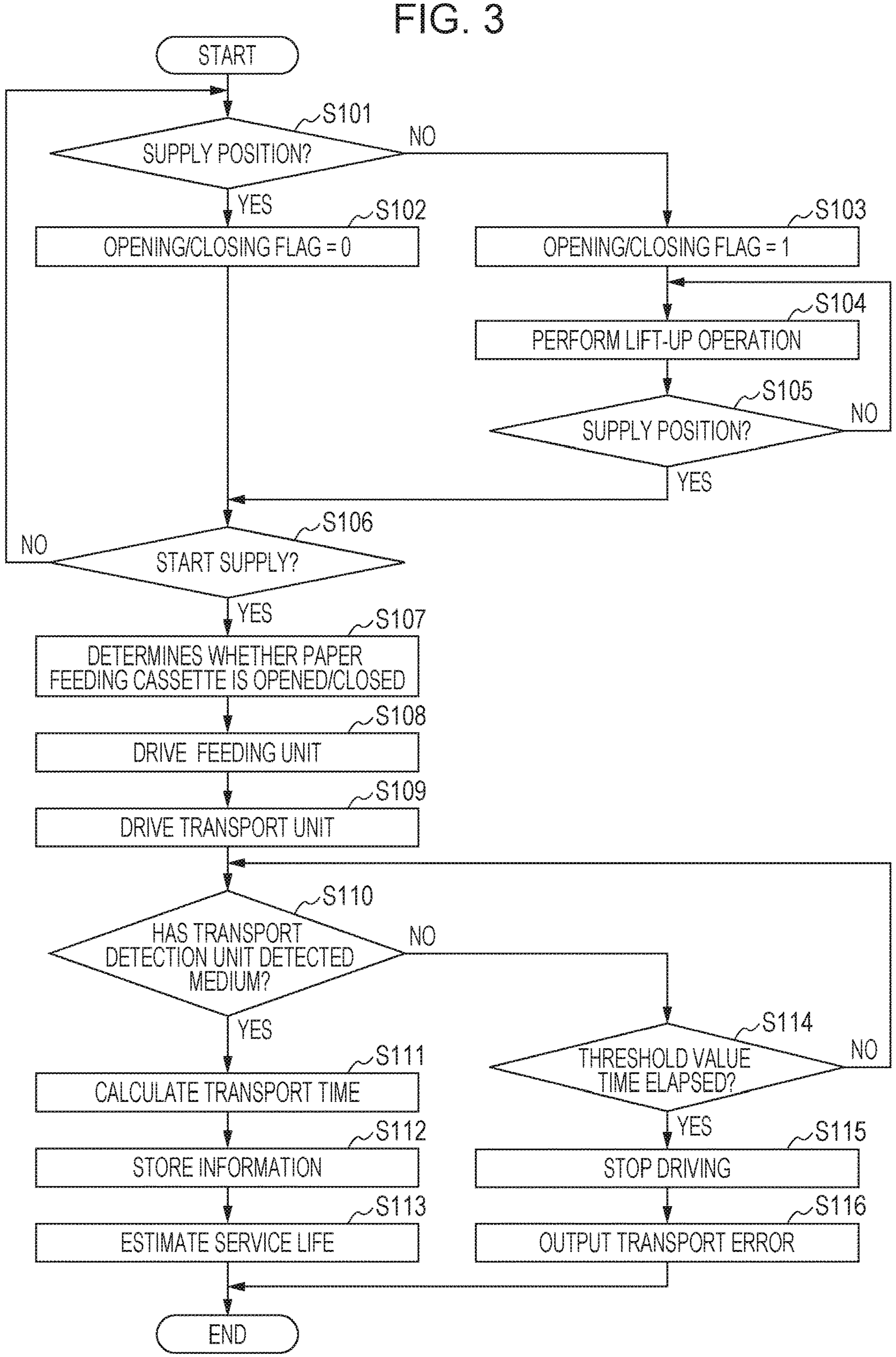
FIG. 3 is a flow chart showing an estimation routine.

The estimation routine shown in FIG. 3 is executed when the recording device 11 is turned on.

As shown in FIG. 3, in step S101, the controller 43 checks whether the hopper 26 is at the supply position Pf based on the result of detection by the lift detection unit 15. When the hopper 26 is at the supply position Pf, YES is selected in step S101, and the controller 43 shifts the process to step S102. In step S102, the controller 43 sets the opening/closing flag to 0, and the process proceeds to step S106.

When the hopper 26 is not at the supply position Pf, NO is selected in step S101, and the controller 43 shifts the process to step S103. In step S103, the controller 43 sets the opening/closing flag to 1. In step S104, the controller 43 performs a lift-up operation. That is, the controller 43 drives the lift motor 25 to lift the hopper 26.

In step S105, the controller 43 determines whether the hopper 26 has moved to the supply position Pf based on the result of detection by the lift detection unit 15. When the hopper 26 is not at the supply position Pf, NO is selected in step S105, and the controller 43 performs the lift-up operation until the hopper 26 moves to the supply position Pf. When the hopper 26 has moved to the supply position Pf, YES is selected in step S105, and the controller 43 shifts the process to step S106.

In step S106, the controller 43 determines whether the supply of the medium 21 set in the paper feeding cassette 13 has started. When the supply of the medium 21 has not started, NO is selected in step S106, and the controller 43 shifts the process to step S101. When the supply of the medium 21 is started, YES is selected in step S106, and the controller 43 shifts the process to step S107.

In step S107, the controller 43 determines whether the paper feeding cassette 13 is opened/closed. The controller 43 may cause the determination unit 47 to determine whether the paper feeding cassette 13 is opened/closed. The determination unit 47 determines presence or absence of opening/closing of the paper feeding cassette 13. When the opening/closing flag is 0, the determination unit 47 determines that the paper feeding cassette 13 is not opened/closed. When the opening/closing flag is 1, the determination unit 47 determines that the paper feeding cassette 13 has been opened/closed.

In step S108, the controller 43 drives the feeding unit 16. In step S109, the controller 43 drives the transport unit 17. In step S110, the controller 43 determines whether the transport detection unit 18 has detected the medium 21. When the transport detection unit 18 detects the medium 21, YES is selected in step S110, and the controller 43 shifts the process to step S111. In step S111, the controller 43 calculates the transport time. The controller 43 may cause the calculation unit 46 to calculate the transport time.

In step S112, the controller 43 stores the time information about the transport time and the opening/closing information about determination of whether the paper feeding cassette 13 is opened/closed in the storage unit 44 in association with each other. The opening/closing information may include the result of determination by the determination unit 47, and may include the opening/closing flag.

In step S113, the controller 43 estimates the service life of the transport detection unit 18 or the transport unit 17. The controller 43 may cause the estimation unit 48 to estimate the service life. The estimation of the service life may be performed each time the transport time is calculated, or may be performed at regular intervals.

In step S110, when the leading edge of the medium 21 has not reached the detection position, the transport detection unit 18 does not detect the medium 21, so that NO is selected in step S110, and the controller 43 shifts the process to step S114.

In step S114, the controller 43 determines whether the threshold value time has passed since the feeding unit 16 started to be driven. When the threshold value time has not elapsed, NO is selected in step S114, and the controller 43 shifts the process to step S110. The controller 43 waits until the transport detection unit 18 detects the medium 21 or until the threshold value time elapses.

When the threshold value time elapses, YES is selected in step S114, and the controller 43 shifts the process to step S115. In step S115, the controller 43 stops driving of the feeding unit 16 and the transport unit 17. In step S116, the controller 43 causes the output unit 49 to output the fact that a transport error such as jamming has occurred, and ends the estimation routine.

Action of Embodiment

The action of the present embodiment will be described. As shown in FIG. 1, when the paper feeding cassette 13 is opened in a state where the recording device 11 is turned on, the lift mechanism 24 lowers the hopper 26. For example, the lift mechanism 24 may lower the medium 21 when the paper feeding cassette 13 is opened during the lift-up operation. The lift mechanism 24 may lower the hopper 26 by its own weight, or may lower the hopper 26 by driving the lift motor 25 in reverse.

When the paper feeding cassette 13 is closed in a state where the recording device 11 is turned on, the lift mechanism 24 lifts the hopper 26. The lift mechanism 24 drives the lift motor 25 to perform a lift-up operation when the hopper 26 is not at the supply position Pf.

The lift mechanism 24 retains the hopper 26 at the supply position Pf during a time when the paper feeding cassette 13 is closed. The retention of the hopper 26 and the release of the retention by the retainer 27 are executed regardless of the power supply of the recording device 11. Therefore, even after the recording device 11 is turned off, the retainer 27 retains the hopper 26 at the supply position Pf. When the paper feeding cassette 13 is opened in a state where the recording device 11 is turned off, the retainer 27 releases the retention of the hopper 26 and lowers the hopper 26.

Power is required for the lift-up operation. When the paper feeding cassette 13 is closed during a time when the recording device 11 is turned off, the lift mechanism 24 performs a lift-up operation at the timing when the recording device 11 is turned on. That is, when the paper feeding cassette 13 is opened/closed during a time when the recording device 11 is turned off, the hopper 26 is positioned at the set position Ps at the time when the recording device 11 is turned on. When the paper feeding cassette 13 is not opened/closed during a time when the recording device 11 is turned off, the hopper 26 is retained at the supply position Pf at the time when the recording device 11 is turned on. Therefore, no lift-up operation is required.

The determination unit 47 may determine presence or absence of opening/closing of the paper feeding cassette 13 during a time when the recording device 11 is turned off based on whether the lift-up operation is performed at the time when the recording device 11 is turned on. When the lift-up operation is not performed at the time when the power is turned on, the determination unit 47 may determine that the paper feeding cassette 13 is not opened/closed during a time when the power is turned off. When the lift-up operation is performed at the time when the power is turned on, the determination unit 47 may determine that the paper feeding cassette 13 is opened/closed during a time when the power is turned off.

When printing starts, the feeding unit 16 feeds the medium 21. The controller 43 may determine that the medium 21 is jammed in the transport path 22 when the transport detection unit 18 does not detect the medium 21 even after a threshold value time has elapsed since the feeding unit 16 was driven. When the recording device 11 includes a plurality of transport detection units 18, the threshold value time may be set for each transport detection unit 18.

When the transport detection unit 18 detects the medium 21, the calculation unit 46 calculates the transport time. The calculation unit 46 calculates the transport time required for the medium 21 supplied from the paper feeding cassette 13 to reach the detection position based on the result of detection by the transport detection unit 18. The transport time may be the time from when the feeding unit 16 starts driving until when the transport detection unit 18 detects the leading edge of the medium 21. When the recording device 11 includes a plurality of transport detection units 18, the calculation unit 46 may calculate the transport time for each transport detection unit 18.

The estimation unit 48 estimates the service life of the transport detection unit 18 or the transport unit 17 based on the time information and the opening/closing information. The estimation unit 48 may estimate the service life by comparing the transport time with the estimated time. The estimated time may be stored in the storage unit 44 in advance. The estimation unit 48 may estimate that the transport detection unit 18 or the transport unit 17 is close to the end of its service life when the transport time exceeds the estimated time. The estimation unit 48 may estimate the time when the transport time exceeds the estimated time from the information stored in the storage unit 44.

When the transport detection unit 18 deteriorates, the transport time longer than the actual time is detected due to the delay in response of the transport detection unit 18. When the transport unit 17 deteriorates, the transport time increases due to an increase in the slippage of the transport roller 32 with respect to the medium 21 and a decrease in the amount of feed that the transport roller 32 can feed in one rotation. The transport time also increases when the medium 21 is not properly set in the paper feeding cassette 13 or when the medium 21 is displaced due to the impact of opening/closing the paper feeding cassette 13.

Therefore, the estimation unit 48 may estimate the service life when the paper feeding cassette 13 is not opened/closed during a time when the recording device 11 is turned off. When estimating the service life, the estimation unit 48 may exclude the transport time after the paper feeding cassette 13 is opened/closed.

Effects of Embodiment

Effects of the present embodiment will be described.

(1) The state of the medium 21 in the paper feeding cassette 13 may change as the paper feeding cassette 13 is opened/closed. The estimation unit 48 estimates the service life of the transport detection unit 18 or the transport unit 17 based on the opening/closing information related to opening/closing of the paper feeding cassette 13 in addition to the time information related to the transport time. Therefore, it is possible to improve the accuracy of estimating the degree of deterioration of the transport detection unit 18 or the transport unit 17.

(2) The determination unit 47 determines presence or absence of whether the paper feeding cassette 13 is opened/closed during a time when the power is turned off based on whether the lift-up operation is performed at the time when the power is turned on. In general, the lift mechanism 24 keeps the medium 21 ready to be supplied by moving up to the supply position Pf. However, when the lift mechanism 24 is positioned at the supply position Pf, the medium 21 may interfere with opening/closing of the paper feeding cassette 13. Therefore, the lift mechanism 24 lowers the medium 21 by moving to the set position Ps below the supply position Pf as the paper feeding cassette 13 is opened. Since the lift mechanism 24 moves from the supply position Pf to the set position Ps by its own weight, the lift mechanism 24 can move even in a state where the recording device 11 is not turned on. However, the lift mechanism 24 cannot move from the set position Ps to the supply position Pf in a state where the recording device 11 is not turned on. The lift mechanism 24 performs a lift-up operation at the time when the recording device 11 is turned on. Presence or absence of whether the paper feeding cassette 13 is opened/closed is correlated with whether the lift-up operation is performed. That is, when the paper feeding cassette 13 is not opened/closed, the lift mechanism 24 is positioned at the supply position Pf, so that the lift-up operation is not performed. When the paper feeding cassette 13 has been opened/closed, the lift mechanism 24 is positioned at the set position Ps, so that a lift-up operation is performed. Therefore, since whether the lift-up operation is performed is used for determining whether the paper feeding cassette 13 is opened/closed, the recording device of the present embodiment can suppress an increase in the number of parts, compared with a recording device in which a separate mechanism for grasping the state of the paper feeding cassette 13 is provided.

(3) The controller 43 controls the lift mechanism 24 based on the result of detection by the lift detection unit 15. Therefore, the present embodiment can save the user's labor, compared with the case where the user operates the lift mechanism 24.

(4) The lift mechanism 24 lowers the medium 21 when the paper feeding cassette 13 is opened during the lift-up operation. Therefore, it is possible to reduce the possibility that the medium 21 obstructs opening/closing of the paper feeding cassette 13.

(5) The storage unit 44 stores the opening/closing information and the time information in association with each other. Therefore, it is possible to estimate the rate of deterioration of the transport detection unit 18 or the transport unit 17.

Modifications

The present embodiment can be implemented with the following modifications. The present embodiment and the following modifications can be implemented in combination with one another as long as there is no technical contradiction.

In a case where the paper feeding cassette 13 is open at the time when the recording device 11 is turned on, the controller 43 may execute the estimation routine after the paper feeding cassette 13 is closed.

The computer 41 that is an example of an external device may include the estimation unit 48. The output unit 49 may output the time information and the opening/closing information stored in the storage unit 44 to the computer 41 including the estimation unit 48 capable of estimating the service life of the transport detection unit 18 or the transport unit 17.

The controller 43 may not store the time information and the opening/closing information in the storage unit 44.

The time information stored in the storage unit 44 and the opening/closing information may not be linked. For example, the controller 43 may store, in the storage unit 44, the time information about the transport time after determining that the paper feeding cassette 13 is not opened/closed.

The controller 43 may prohibit opening/closing of the paper feeding cassette 13 during the lift-up operation. The controller 43 may permit opening/closing of the paper feeding cassette 13 after the lift-up operation is completed.

The lift-up operation may be performed manually by the user.

The recording device 11 may include a moving unit (not shown) and a return mechanism (not shown). The moving unit moves from a first position to a second position as the paper feeding cassette 13 is opened. The return mechanism returns the moving unit to the first position with the paper feeding cassette 13 closed. At least one of the moving unit and the return mechanism may be provided in the paper feeding cassette 13. At least one of the moving unit and the return mechanism may be provided on the main body 12. The determination unit 47 may determine presence or absence of opening/closing of the paper feeding cassette 13 depending on whether the moving unit is at the first position or at the second position.

The recording device 11 may include a first mechanism including the paper feeding cassette 13 and a second mechanism including the recording unit 19. The first mechanism and the second mechanism may be separate devices.

The recording device 11 may include the computer 41. That is, the recording system 40 may function as a recording device. The recording device 11 and the computer 41 may be directly communicably coupled by wire or wirelessly.

The recording system 40 may include a plurality of recording devices 11. The recording system 40 may include a plurality of computers 41. The recording system 40 may include a server communicable via the network NT.

The recording device 11 may not include the output unit 49. The output unit 49 may be provided separately from the recording device 11. The recording system 40 may include the output unit 49. The output unit 49 such as a display may communicate with the recording device 11 via the network NT.

The recording device 11 is not limited to an ink jet printer, and may be a laser printer, a thermal printer, a dot impact printer, a digital printing machine, or the like.

The recording device may be a liquid ejecting apparatus that performs recording by ejecting a liquid other than ink. The state of the liquid ejected from the liquid ejecting apparatus in the form of a minute amount of droplets includes particles, teardrops, and filamentous tails. The liquid referred to here may be any material that can be ejected from the liquid ejecting apparatus. For example, the liquid may be a substance in a state when the substance is in the liquid phase, and includes fluid materials such as liquids having high or low viscosity, sol, gel water, other inorganic solvents, organic solvents, solutions, liquid resins, liquid metals, metal melts. Further, the liquid includes not only a liquid as a state of a substance but also a liquid in which particles of a functional material made of a solid such as a pigment or metal particles are dissolved, dispersed, or mixed in a solvent. Representative examples of the liquid include ink and liquid crystal as described in the above embodiment. Here, the ink includes various liquid compositions such as general water-based ink and oil-based ink, gel ink, and hot-melt ink. Specific examples of the liquid ejecting apparatus include a device that ejects a liquid containing, in a dispersed or dissolved form, a material such as an electrode material or a coloring material used for manufacturing a liquid crystal display, an electroluminescence display, a surface emitting display, or a color filter. The liquid ejecting apparatus may be a device that ejects a bioorganic substance used in biochip manufacturing, a device that ejects a liquid serving as a sample used as a precision pipette, printing equipment, a micro dispenser, or the like. The liquid ejecting apparatus may be a device that ejects lubricating oil to a precision machine such as a watch or a camera at a pinpoint or a device that ejects a transparent resin liquid such as an ultraviolet curable resin onto the substrate in order to form a micro hemispherical lens used for an optical communication element, an optical lens, or the like. The liquid ejecting apparatus may be a device that ejects an etching liquid such as acid or alkali for etching the substrate and the like.

Definition

As used herein, the expression "at least one" means "one or more" of the desired option. As an example, the expression "at least one" as used herein means "only one option" or "both of the two options" when the number of options is two. As another example, the expression "at least one" used herein means "only one option" or "any combination of two or more options" when the number of options is three or more.

APPENDIX

In the following, technical ideas and their functions and effects which are grasped from the above-described embodiments and modifications will be described.

(A) A recording device includes a recording unit that performs recording on a medium, a paper feeding cassette that accommodates the medium and is configured to be opened/closed, a transport unit that transports the medium accommodated in the paper feeding cassette along a transport path, a transport detection unit that detects the medium at a detection position provided at the transport path, a calculation unit that calculates a transport time required for the medium supplied from the paper feeding cassette to reach the detection position based on a result of detection by the transport detection unit, a determination unit that determines presence or absence of whether the paper feeding cassette is opened/closed, and an estimation unit that estimates a service life of the transport detection unit or the transport unit based on time information about the transport time and opening/closing information about determination of whether the paper feeding cassette is opened/closed.

The state of the medium in the paper feeding cassette may change as the paper feeding cassette is opened/closed. According to this configuration, the estimation unit estimates the service life of the transport detection unit or the transport unit based on the opening/closing information related to opening/closing of the paper feeding cassette in addition to the time information related to the transport time. Therefore, it is possible to improve the accuracy of estimating the degree of deterioration of the transport detection unit or the transport unit.

(B) In the recording device, the paper feeding cassette may have a lift mechanism configured to lift/lower the medium, wherein the lift mechanism may be configured to perform a lift-up operation of lifting the medium, and wherein the determination unit may determine presence or absence of whether the paper feeding cassette is opened/closed during a time when the recording device is turned off based on whether the lift-up operation is performed at a time when the recording device is turned on.

According to this configuration, the determination unit determines presence or absence of whether the paper feeding cassette is opened/closed during a time when the power is turned off based on whether the lift-up operation is performed at the time when the power is turned on. In general, the lift mechanism keeps the medium ready to be supplied by moving up to the supply position. However, when the lift mechanism is positioned at the supply position Pf, the medium may interfere with opening/closing of the paper feeding cassette. Therefore, the lift mechanism lowers the medium by moving to the set position below the supply position as the paper feeding cassette is opened. Since the lift mechanism moves from the supply position to the set position by its own weight, the lift mechanism can move even in a state where the recording device is not turned on. However, the lift mechanism cannot move from the set position to the supply position in a state where the recording device is not turned on. The lift mechanism performs a lift-up operation at the time when the recording device is turned on. Presence or absence of whether the paper feeding cassette is opened/closed is correlated with whether the lift-up operation is performed. That is, when the paper feeding cassette is not opened/closed, the lift mechanism is positioned at the supply position, so that the lift-up operation is not performed. When the paper feeding cassette has been opened/closed, the lift mechanism is positioned at the set position, so that a lift-up operation is performed. Therefore, since whether the lift-up operation is performed is used for determining whether the paper feeding cassette is opened/closed, the recording device of the present embodiment can suppress an increase in the number of parts, compared with a recording device in which a separate mechanism for grasping the state of the paper feeding cassette is provided.

(C) The recording device may include a lift detection unit that detects the lift mechanism at a supply position, and a controller that controls the lift mechanism based on a result of detection by the lift detection unit.

According to this configuration, the controller controls the lift mechanism based on the result of detection by the lift detection unit. Therefore, the present embodiment can save the user's labor, compared with the case where the user operates the lift mechanism.

(D) In the recording device, when the paper feeding cassette is opened during the lift-up operation, the lift mechanism may lower the medium. According to this configuration, the lift mechanism lowers the medium when the paper feeding cassette is opened during the lift-up operation. Therefore, it is possible to reduce the possibility that the medium obstructs opening/closing of the paper feeding cassette.

(E) The recording device may include a storage unit that stores the time information and the opening/closing information in association with each other. According to this configuration, the storage unit stores the opening/closing information and the time information in association with each other. Therefore, it is possible to estimate the rate of deterioration of the transport detection unit or the transport unit.

(F) A recording device includes a recording unit that performs recording on a medium, a paper feeding cassette that accommodates the medium and is configured to be opened/closed, a transport unit that transports the medium accommodated in the paper feeding cassette along a transport path, a transport detection unit that detects the medium at a detection position provided at the transport path, a calculation unit that calculates a transport time required for the medium supplied from the paper feeding cassette to reach the detection position based on a result of detection by the transport detection unit, a determination unit that determines presence or absence of opening/closing of the paper feeding cassette, a storage unit that stores time information about the transport time and opening/closing information about determination of whether the paper feeding cassette is opened/closed in association with each other, and an output unit that outputs the time information and the opening/closing information stored in the storage unit to an external device including an estimation unit configured to estimate a service life of the transport detection unit or the transport unit.

According to this configuration, the same effects as those of the recording device can be obtained.

(G) A service life estimation method performed by a recording device including a recording unit that performs recording on a medium, a paper feeding cassette that accommodates the medium and is configured to be opened/closed, a transport unit that transports the medium accommodated in the paper feeding cassette along a transport path, and a transport detection unit that detects the medium at a detection position provided at the transport path, the method includes calculating a transport time required for the medium supplied from the paper feeding cassette to reach the detection position, determining presence or absence of whether the paper feeding cassette is opened/closed, and estimating a service life of the transport detection unit or the transport unit based on time information about the transport time and opening/closing information about determination of whether the paper feeding cassette is opened/closed.

According to this method, the effects same as those of the recording device can be obtained.

What is claimed is:

1. A recording device comprising:

a recording unit that performs recording on a medium;

a paper feeding cassette that accommodates the medium and is configured to be opened/closed;

a transport unit that transports the medium accommodated in the paper feeding cassette along a transport path;

a transport detection unit that detects the medium at a detection position provided at the transport path;

a calculation unit that calculates a transport time required for the medium supplied from the paper feeding cassette to reach the detection position based on a result of detection by the transport detection unit;

a determination unit that determines presence or absence of whether the paper feeding cassette is opened/closed; and an estimation unit that estimates a service life of the transport detection unit or the transport unit based on time information about the transport time and opening/closing information about determination of whether the paper feeding cassette is opened/closed, wherein the estimation unit excludes the transport time after the paper feeding cassette is opened/closed for the estimation.

2. The recording device according to claim 1, wherein the paper feeding cassette has a lift mechanism configured to lift/lower the medium, wherein the lift mechanism is configured to perform a lift-up operation of lifting the medium, and wherein the determination unit determines presence or absence of whether the paper feeding cassette is opened/closed during a time when the recording device is turned off based on whether the lift-up operation is performed at a time when the recording device is turned on.

3. The recording device according to claim 2, further comprising:

a lift detection unit that detects the lift mechanism at a supply position; and a controller that controls the lift mechanism based on a result of detection by the lift detection unit.

4. A recording device according to claim 2, wherein the lift mechanism lowers the medium when the paper feeding cassette is opened during the lift-up operation.

5. The recording device according to claim 1, further comprising:

a storage unit that stores the time information and the opening/closing information in association with each other.

6. The recording device according to claim 1, wherein when the paper feeding cassette is opened, a retainer releases retention of a hopper so that the hopper moves down to a set position below the supply position by its weight.

7. A recording device comprising:

a recording unit that performs recording on a medium;

a paper feeding cassette that accommodates the medium and is configured to be opened/closed;

a transport unit that transports the medium accommodated in the paper feeding cassette along a transport path;

a transport detection unit that detects the medium at a detection position provided at the transport path;

a calculation unit that calculates a transport time required for the medium supplied from the paper feeding cassette to reach the detection position based on a result of detection by the transport detection unit;

a determination unit that determines presence or absence of opening/closing of the paper feeding cassette;

a storage unit that stores time information about the transport time and opening/closing information about determination of whether the paper feeding cassette is opened/closed in association with each other; and an output unit that outputs the time information and the opening/closing information stored in the storage unit to an external device including an estimation unit configured to estimate a service life of the transport detection unit or the transport unit by excluding the transport time after the paper feeding cassette is opened/closed.

8. A service life estimation method, the method performed by a recording device including a recording unit that performs recording on a medium, a paper feeding cassette that accommodates the medium and is configured to be opened/closed, a transport unit that transports the medium accommodated in the paper feeding cassette along a transport path, and a transport detection unit that detects the medium at a detection position provided at the transport path, the method comprising:

calculating a transport time required for the medium supplied from the paper feeding cassette to reach the detection position;

determining presence or absence of whether the paper feeding cassette is opened/closed; and estimating a service life of the transport detection unit or the transport unit based on time information about the transport time and opening/closing information about determination of whether the paper feeding cassette is opened/closed by excluding the transport time after the paper feeding cassette is opened/closed.

* * * * *